US010867402B2

(12) United States Patent
Gross et al.

(10) Patent No.: US 10,867,402 B2
(45) Date of Patent: Dec. 15, 2020

(54) SYSTEM AND METHOD FOR DETERMINING DISTANCE TO OBJECT ON ROAD

(71) Applicant: HERE GLOBAL B.V., Eindhoven (NL)

(72) Inventors: Amit Gross, KfarSaba (IL); Silviu Zilberman, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 101 days.

(21) Appl. No.: 16/290,379

(22) Filed: Mar. 1, 2019

(65) Prior Publication Data
US 2020/0279391 A1 Sep. 3, 2020

(51) Int. Cl.
| G06K 9/00 | (2006.01) |
| G06T 7/70 | (2017.01) |
| G06T 7/00 | (2017.01) |
| G08G 1/04 | (2006.01) |
| G08G 1/0967 | (2006.01) |

(52) U.S. Cl.
CPC .......... *G06T 7/70* (2017.01); *G06T 7/97* (2017.01); *G08G 1/04* (2013.01); *G08G 1/0967* (2013.01); *G06T 2207/10016* (2013.01); *G06T 2207/30261* (2013.01)

(58) Field of Classification Search
CPC ............ G06K 9/00797; G06K 9/00196; G06T 7/0075; G06T 7/70; G06T 7/97; G06T 2207/10016; G06T 2207/30256; G06T 2207/10012; G06T 2207/30261; G08G 1/054; G08G 1/04; G08G 1/0967; B60R 1/00; H04N 13/0239

See application file for complete search history.

(56) References Cited

U.S. PATENT DOCUMENTS

| 7,277,559 | B2 | 10/2007 | Matsunaga et al. |
| 8,456,524 | B2 | 6/2013 | Marti et al. |
| 8,489,319 | B2 | 7/2013 | Ellanti |
| 9,429,438 | B2 | 8/2016 | Weng et al. |
| 9,517,767 | B1 * | 12/2016 | Kentley ............. G06K 9/00791 |
| 9,699,628 | B2 * | 7/2017 | Radhakrishnan ....... H04W 4/12 |
| 9,804,599 | B2 * | 10/2017 | Kentley-Klay ...... G05D 1/0088 |

(Continued)

FOREIGN PATENT DOCUMENTS

KR    20180056534 A    5/2018

*Primary Examiner* — Amir Alavi
(74) *Attorney, Agent, or Firm* — Ditthavong & Steiner, P.C.

(57) ABSTRACT

Various aspects of a system, a method, and a computer program product for determining a distance to the object on a road are disclosed herein. In accordance with an embodiment, the system includes a memory and a processor. The processor may be configured to receive visual data, location data and motion data of the vehicle corresponding to the first instance in time, and map data corresponding to the location data. The processor may be configured to calculate a distance of the vehicle from the object based on the visual data. The processor may be further configured to validate the location data, the motion data, and the calculated distance of the vehicle from the object, based on the map data. The processor may be further configured to generate output data corresponding to the object, based on the validated location data, the validated motion data, and the validated distance of the vehicle from the object.

20 Claims, 6 Drawing Sheets

(56) References Cited

U.S. PATENT DOCUMENTS

| | | | |
|---|---|---|---|
| 9,884,585 B1 | 2/2018 | Lubbers | |
| 9,975,483 B1 * | 5/2018 | Ramaswamy | |
| 10,053,088 B1 * | 8/2018 | Askeland | G06K 9/6267 |
| 10,275,662 B1 * | 4/2019 | Askeland | H04N 5/247 |
| 10,372,130 B1 * | 8/2019 | Kaushansky | B60W 60/001 |
| 10,427,631 B1 * | 10/2019 | Jimenez | B60R 19/00 |
| 10,486,485 B1 * | 11/2019 | Levinson | B60G 17/0165 |
| 10,688,841 B1 * | 6/2020 | Chen | B60G 17/019 |
| 2020/0039514 A1 * | 2/2020 | Shivamurthy | G06K 9/00791 |

\* cited by examiner

SYSTEM AND METHOD FOR DETERMINING DISTANCE TO OBJECT ON ROAD

TECHNOLOGICAL FIELD

Various embodiments of the disclosure relate to a system and a method for collision avoidance with an object. More particularly, the various embodiments of the present disclosure relate to a system and a method for determining a distance to the object on a road to avoid collision with the object.

BACKGROUND

Recent developments in smart phone applications have been popularly used by drivers of vehicles for navigation, such as, tracking any location, person, and vehicle to navigating around in unknown territory. Further, driving a vehicle may demand a high attention of a driver and any distraction that may pull a driver's attention away from the road, may result in endangering the driver, passengers, and bystanders.

In certain scenarios, the driver may use one or more applications on a smart phone for navigation from one location to another location. In such scenarios, the driver may have to activate and interact with the smart phone application, such as, a built-in car-media-center application. In certain scenarios, the driver may miss presence of an obstacle, such as a traffic pole on the road, during use of a smart phone application that may potentially cause an accident. In some scenarios, the driver may miss a demand, such as signaling from a potential customer to stop the vehicle. In other scenarios, the driver may wrongly estimate a distance of an object, such as, the obstacle ahead of the vehicle because of the distraction while using the smart phone application. The existing systems that calculate the distance between the vehicle and the object may be expensive, inaccurate and require careful installation of hardware.

Further limitations and disadvantages of conventional and traditional approaches will become apparent to one of skill in the art, through comparison of described systems with some aspects of the present disclosure, as set forth in the remainder of the present application and with reference to the drawings.

BRIEF SUMMARY

A system, a method, and a computer program product are provided in accordance with an example embodiment described herein for determining distance to an object on a road as shown in, and/or described in connection with, at least one of the figures, as set forth more completely in the claims.

Embodiments disclosed herein may provide a system for generating route data of one or more routes through a roadwork zone. The system includes at least one non-transitory memory configured to store computer program code instructions, and at least one processor configured to execute the computer program code instructions to receive visual data of a plurality of images corresponding to the object in a field-of-view of a vehicle on the road. The plurality of images are time synchronized to a first instance in time. The at least one processor is further configured to obtain motion data and location data of the vehicle corresponding to the first instance in time, and map data corresponding to the location data, calculate a distance of the vehicle from the object based on the visual data, validate the location data, the motion data, and the calculated distance of the vehicle from the object, based on the map data, and generate output data corresponding to the object, based on the validated location data, the validated motion data, and the validated distance of the vehicle from the object.

The map data includes one or more of a functional class of the road, a speed limit of the road, a presence of a road sign on the road, directionality of the road, a number of lanes in the road, a speed category, and a distance to a point of interest.

The at least one processor is optionally configured to determine a speed of the vehicle corresponding to the first instance in time, based on the motion data, and correlate the determined speed of the vehicle to the speed limit associated with the road to validate the motion data.

The at least one processor is further configured to determine a location of the vehicle corresponding to the first instance in time, based on the location data, and correlate the calculated distance of the object to the path of the road to validate the calculated distance of the vehicle from the object on the road.

The system may optionally comprise a plurality of image capture devices configured to capture the plurality of images.

Each of at least two image capture devices of the plurality of image capture devices includes at least one motor configured to provide accurate positioning to a respective one of the at least two image capture devices to capture at least one of the plurality of images. The at least one processor is further configured to control the at least one motor of each of the at least two image capture devices to capture the field of view.

The at least one processor is further configured to interpolate the plurality of images to the first instance in time to compensate for timing gaps in capture of the plurality of images.

The at least one processor is further configured to generate a notification message based on the calculated distance of the vehicle from the object being less than a threshold distance.

The at least one processor is further configured to classify the detected object into an object type based on one or more attributes of the detected object, wherein the object type corresponds to one of a vehicle, a traffic pole, a tree, or a pedestrian.

In an example embodiment, a method for determining distance to an object on a road, is provided. The method includes receiving visual data of a plurality of images corresponding to the object in a field-of-view of a vehicle on the road. The plurality of images are time synchronized to a first instance in time. The method further includes obtaining motion data and location data of the vehicle corresponding to the first instance in time, and map data corresponding to the location data, calculating by a processor, a distance of the vehicle from the object based on the visual data, validating by the processor, the location data, the motion data, and the calculated distance of the vehicle from the object, based on the map data, and generating output data corresponding to the object, based on the validated location data, the validated motion data, and the validated distance of the vehicle from the object.

Embodiments of the present invention may provide a computer program product including at least one non-transitory computer-readable storage medium having computer-executable program code instructions stored therein. The computer-executable program code instructions when executed by a computer, cause the computer to carry out operations for determining distance to an object on a road. The operations comprise receiving visual data of a plurality of images corresponding to the object in a field-of-view of a vehicle on the road, wherein the plurality of images are time synchronized to a first instance in time, obtaining motion data and location data of the vehicle corresponding to the first instance in time, and map data corresponding to the location data, calculating a distance of the vehicle from the object based on the visual data, validating the location data, the motion data, and the calculated distance of the vehicle from the object, based on the map data, and generating output data corresponding to the object, based on the validated location data, the validated motion data, and the validated distance of the vehicle from the object.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The embodiments of the invention are illustrated by way of example, and not by way of limitation, in the figures of the accompanying drawings, wherein.

DETAILED DESCRIPTION

Figure 1:
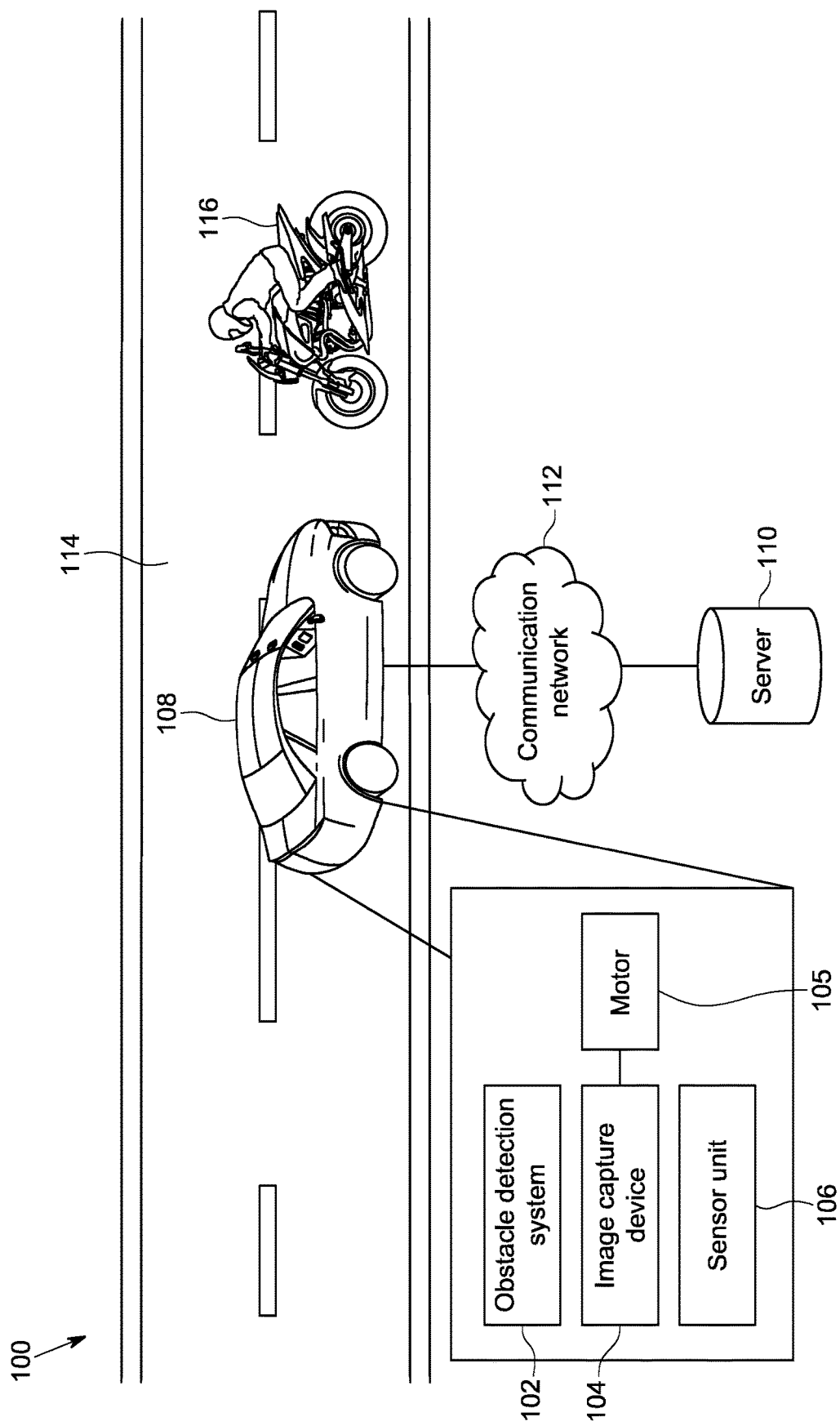
FIG. 1 is a block diagram that illustrates a network environment of a system for determining distance to an object on a road, in accordance with an embodiment of the disclosure.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "speed funnel" may be used to refer to a group of two or more speed limit signs indicating a change in sign values of speed limit signs from one end of the speed funnel to the other. A speed funnel may be used as an indication for a roadwork zone, an upcoming tunnel on a pathway, or a transition from a highway to a ramp.

The term "route" may be used to refer to a path from a source location to a destination location on any link.

End of Definitions

The following described implementations may be found in the disclosed system, method, and computer program product for determining a distance to an object on a road. Exemplary aspects of the disclosure may include a system for determining a distance to an object on a road to avoid collision.

FIG. 1 is a block diagram that illustrates a system for determining a distance to an object on a road, in accordance with an embodiment of the disclosure. With reference to FIG. 1, there is shown a network environment 100 that may include an obstacle detection system 102, a plurality of image capture devices 104, a sensor unit 106, a vehicle 108, a cloud server 110, and a communication network 112. There is further shown a road 114 and an object 116. The obstacle detection system 102 may be communicatively coupled to the plurality of image capture devices 104 and the sensor unit 106, via the communication network 112. Further, the obstacle detection system 102 may be communicatively coupled to the cloud server 110, via the communication network 112. In some example embodiments, the obstacle detection system 102 and the plurality of image capture devices 104 may be mounted in the vehicle 108. However, in accordance with an embodiment, the plurality of image capture devices 104 may additionally or optionally be installed anywhere other than the vehicle 108, such as, but not limited to, traffic poles, a building, or under the bridge. As such, the plurality of image capture devices 104 may also correspond to surveillance cameras, mounted cameras, and the like.

The obstacle detection system 102 may comprise suitable logic, circuitry, interfaces, and/or code that may be configured to determine a distance of the vehicle 108 from the object 116 on the road 114. The object 116 may correspond to an obstacle for the vehicle 108 on the road 114. The obstacle detection system 102 may be further configured to determine a location and a speed of the vehicle 108 at an instance in time, such as, at a first instance in time. The obstacle detection system 102 may be configured to receive visual data of a plurality of images that corresponds to the object 116 in a field-of-view of the vehicle 108 on the road 114. The obstacle detection system 102 may be further configured to control one or more motors associated with the plurality of image capture devices 104 to capture a field of view. The obstacle detection system 102 may be configured to interpolate the plurality of images to a certain instance in time to compensate for timing gaps in capture of the plurality of images. The obstacle detection system 102 may be configured to generate an output data to avoid collision of the vehicle 108 with the object 116.

In accordance with an embodiment, the obstacle detection system 102 may be a part of a user equipment of the vehicle 108. Examples of the obstacle detection system 102 may include, but are not limited to, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The plurality of image capture devices 104 may comprise suitable logic, circuitry, interfaces, and code that may be configured to capture a plurality of images that corresponds to the object 116 in the field-of-view of the vehicle 108 on the road 112. In some example embodiments, one or more of the plurality of image capture devices 104 may be separate from the obstacle detection system 102. However, in accordance with an embodiment, one or more the plurality of image capture devices 104 may be a part of the obstacle detection system 102. In some embodiments, the plurality of image capture devices 104 may be mounted inside the vehicle 108 or an outer side of the vehicle 108. In yet another embodiment, the plurality of image capture devices 104 may be mounted at a location away from the vehicle, such as, but not limited to, on the traffic pole, the building, a tree or under the bridge. In accordance with an embodiment, the plurality of image capture devices may include one or more motors configured to control movement of a respective image capture device to capture one or more of the plurality of images.

In accordance with an embodiment, the plurality of image capture devices 104 may also comprise storage means configured to store the captured plurality of images. Examples of the plurality of image capture devices 104 may include, but are not limited to, digital cameras, closed circuit television cameras, a charge-couple device (CCD), a complementary metal oxide silicon device (CMOS), infra-red sensor arrays, web camera, video camera, or digital cameras equipped in smart phone, laptop, notepad or personal computer.

In accordance with an embodiment, the motor unit 105 may comprise suitable logic, circuitry, interfaces, and code that may be configured to control movement of the one or more of the plurality of image capture devices 104. The motor unit 105 may be configured to provide accurate positioning to the one or more of the plurality of image capture devices 104 to capture the field of view from the vehicle. In accordance with an embodiment, at least two image capture devices of the plurality of image capture devices 104 may include at least one motor of the motor unit. The motor in the motor unit 105 may be configured to control movement of a respective one of the at least two image capture devices to capture one or more of the plurality of images. In accordance with an exemplary embodiment, the motor unit 105 may be configured to control a second image capture device from a first image capture device and a second image capture device. In accordance with an embodiment, the first image capture device may capture the plurality of images of the field of view at first instance of time. The second capture device that may be controlled by the motor unit 105 may capture the plurality of images of the same field of view as captured by the first image capture device at a second instance of time. In accordance with an embodiment, the motor unit 105 may be communicatively coupled to the image capture device 104. In accordance with an embodiment, the motor unit 105 may be integrated into the image capture device 104 as a single entity. Examples of the motor unit 105 may include, but are not limited to, geared servo motor, geared stepper motor, and light controlled 3D micro motors The sensor unit 106 may comprise suitable logic, circuitry, interfaces, and code that may be configured to detect data related to physical variables associated with the vehicle 108. The physical variables may include speed, location and distance of the vehicle 108. The sensor unit 106 may include an array of sensors that is equipped in the vehicle 108. The sensor unit 106 may capture sensory data of the vehicle or may receive sensor data from an original equipment manufacturer (OEM) cloud for the vehicles. The sensor unit 106 may be configured to detect a location and speed of the vehicle 108 at an instance of time, such as a first instance of time. In accordance with an embodiment, the sensor unit 106 may be configured to determine status of various control elements of the car, such as activation of wipers, use of a brake pedal, use of an acceleration pedal, angle of the steering wheel, activation of hazard lights, and activation of head lights. In accordance with an embodiment, the sensor unit 106 may include image capture devices (such as the image capture device 104), radars and Light Detection and Ranging (LIDAR). In accordance with an embodiment, the image capture device 104 may be integrated inside the sensor unit 106 or a separate entity from the sensor unit 106. Examples of the sensor unit 106 may include, but are not limited to, proximity sensors, acceleration sensors, active distance sensors, location sensors (e.g., GPS/satellite-based location sensors or equivalent).

The vehicle 108 may correspond to a manual vehicle or an autonomous vehicle. An autonomous vehicle, as used throughout this disclosure, may refer to a vehicle having autonomous driving capabilities at least in some conditions. The autonomous vehicle may operate with reduced or no human driver input. The vehicle 108 may be an autonomous vehicle or highly assisted driving vehicle that may be capable of sensing an environment around the vehicle 108 and navigating within a road network without a driver or an occupant input. The autonomous vehicles and highly assisted driving vehicles may be a part of a spectrum of vehicle classifications that may span from no automation to fully autonomous operation. The vehicle 108 may be equipped with the obstacle detection system 102 to generate notification messages to provide situational awareness and improve safety for drivers. In accordance with an embodiment, the vehicle 108 may automatically react to objects (such as object 116) that may be detected on the road 114. In accordance with an embodiment, the vehicle 108 may include GPS or other satellite-based receivers to obtain geographic coordinates from satellites for determining current location of the vehicle 108.

The server 110 may comprise suitable logic, circuitry, interfaces, and/or code that may be configured to receive map data from map database of the server. The map data may correspond to a geographic database and may be associated with the segment of interest. The map data for the area surrounding a current location of the vehicle 108 may be processed by the obstacle detection system 102 via the communication network 112. In accordance with an embodiment, the map data received from the server 110 by the obstacle detection system 102 may be rendered on a display screen of the obstacle detection system 102. The server 110 may receive a current location of the obstacle detection system 102 from a Global Positioning System (GPS). In an embodiment, the server 110 may be implemented as a cloud-based server and/or a web-based server. The server 110 may be implemented using several technologies that are well known to those skilled in the art.

The communication network 112 may comprise suitable logic, circuitry, and interfaces that may be configured to provide a plurality of network ports and a plurality of communication channels for transmission and reception of data, such as visual data, location data, map data and motion data. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 112 may include a medium through which the obstacle detection system 102, and/or the server 110 may communicate with each other. The communication network 112 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the communication network 112 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

A person having ordinary skill in the art will understand that the scope of the disclosure is not merely limited to implementation of the disclosed system and method for determining a distance to the object on a road to avoid collision of the vehicle with the object, as shown. In accordance with an embodiment, the disclosed system and method may be installed on a traffic pillar or a building for surveillance purposes.

In operation, the vehicle 108 may be travelling on the road 114. In accordance with an embodiment, the vehicle 108 may be in an autonomous driving mode (also referred to as autonomous mode) or a manual driving mode (also referred to as manual mode) where a driver may drive the vehicle 108. The road 114 may support bi-directional traffic with the vehicle 108 traveling in one direction and the object 116 may be traveling in an opposite direction of the vehicle 108. The object 116 may correspond to a motorcyclist. In accordance with an embodiment, the object may include, but not limited to a roadblock, a tree, a traffic pole, a pot hole, a pedestrian, a cycle or a vehicle.

In accordance with an embodiment, the driver of the vehicle 108 may interact with an application on a user equipment of the vehicle 108 while driving on the road 114. The user equipment in the vehicle 108 may be associated with the obstacle detection system 102. The driver may lose focus while driving and handling the user equipment. As a result, the driver may jeopardize the safety of passengers in the vehicle 108 travelling on the road 114 by collision with the objects, such as the object 116. The obstacle detection system 102 may be configured to detect the objects, such as the object 106 that may come in path of the vehicle 106 to avoid collision with the object 106. For detection of the object 106, the obstacle detection system 102 may be configured to receive visual data of a plurality of images corresponding to the object 116 in a field-of-view of a vehicle 108 on the road 114. The visual data of the plurality of images may be captured by the plurality of image capture devices 104 in real-time or near real-time. The field of view may correspond to surroundings of the vehicle 108 that may include left, right, front and rear view of the vehicle 108. In accordance with an embodiment, each of at least two image capture devices of the plurality of image capture devices 104 may include one or more motors in the motor unit 105. The one or more motors in the motor unit 105 may be configured to control movement of a respective one of the at least two image capture devices 104 to capture one or more of the plurality of images. In accordance with an embodiment, the obstacle detection system 102 may be further configured to control the at least one motor of each of the at least two image capture devices 104 to capture the field of view.

The obstacle detection system 102 may be configured to receive visual data of a plurality of images from the plurality of image capture devices 104 in real time or near real time, continuously, periodically, according to a schedule, or on demand. The obstacle detection system 102 may perform image processing on the visual data to detect the object 116. Any suitable algorithm may be utilized for aforesaid image processing.

The obstacle detection system 102 may be configured to interpolate the plurality of images to the first instance in time to compensate for timing gaps in capture of the plurality of images for time alignment of the plurality of image capture devices 104. The type aligned or time synced images may be generated for a common time stamp. The interpolation of the images may be performed by interpolation methods, such as simple pixel interpolation and convolutional neural network (CNN). Interpolation of images may help in easy installation and fault tolerance of the image capture devices 104 as hardware synchronization of the image capture devices 104 may not be required.

The obstacle detection system 102 may be configured to classify the detected object 116 as a motorcycle. The motorcycle may be an object type based on one or more attributes of the detected object. The object type may further correspond to one of a vehicle, a traffic pole, a tree, animal, light pole or a pedestrian.

The obstacle detection system 102 may be configured to calculate a distance of the vehicle 106 from the object 116 that is detected and classified from the plurality of images captured from the plurality of image capture devices 104 via the communication network 112. In accordance with an embodiment, the driver may adjust the speed of the vehicle 108 based on the relative distance between the vehicle 108 and the detected object 116 being too close to the vehicle 108. In accordance with an embodiment, the obstacle detection system 102 may be configured to process the visual data received from the plurality of image capture devices 104 into depth information for calculation of the distance of the vehicle 106 from the object 116. In accordance with an embodiment, the obstacle detection system 102 may be configured to calculate the speed of the vehicle 108 based on the depth information received from the plurality of image capture devices 104. In accordance with an embodiment, the obstacle detection system 102 may calculate the speed and distance of the vehicle 108 based on a navigation application installed in the user equipment of the vehicle or a smart phone in the vehicle. In accordance with an embodiment, information from the navigation application may determine that how fast the vehicle 108 may approach the object 116.

The obstacle detection system 102 may be configured to obtain the motion data and the location data of the vehicle 108 corresponding to the first instance in time from the sensor unit 106. The vehicle 108 may be configured with the sensor unit 106 that includes a plurality of sensors. The sensor unit 106 may be configured to generate location data and motion data related to the vehicle 108 in an instance in time, such as a first instance in time. In accordance with an embodiment, the location data may represent data associated with a geographic location of the vehicle in the first instance of time, the time when the location data may be collected. In accordance with an embodiment, the motion data may represent data associated with velocity or speed of the vehicle in the first instance of time. In accordance with an embodiment, the location data may be determined by visual odometry, triangulation systems such as A-GPS, Cell of Origin, or other location extrapolation technologies.

The obstacle detection system 102 may be further configured to obtain map data corresponding to the location data of the vehicle 108. The map data received by the obstacle detection system 102 from the server 110 may include, but not limited to, a geographic location, or a route desired by a user. The obstacle detection system 102 may receive map data for a requested map data for a road segment of interest, such as the road 114 by performing a location-based query of the geographic database in the server 108 or equivalent. For example, the map data may include any attribute of the road 114 or corresponding map location stored in the geographic database of the server 108. Further, the received map data may include, but is not limited to, one or more of a functional class of the road, a speed limit of the road, a presence of a road sign on the road, directionality of the road, a number of lanes in the road, a speed category, and a distance to a point of interest, such as the object 116.

The obstacle detection system 102 may be further configured to validate the location data, the motion data, and the calculated distance of the vehicle 108 from the object 116, based on the map data. The validation of the location data, the motion data, and the calculated distance of the vehicle 108 from the object 116, based on the map data may improve the accuracy of how far the object 116 may be from the vehicle 108 to avoid collision.

The obstacle detection system 102 may be further configured to generate output data corresponding to the object 116, based on the validated location data, the validated motion data, and the validated distance of the vehicle 108 from the object 116. The generated output data may correspond to a notification message based on the calculated distance of the vehicle 108 from the object 116 being less than a threshold distance. The threshold distance may be preset in the obstacle detection system 102.

Figure 2:
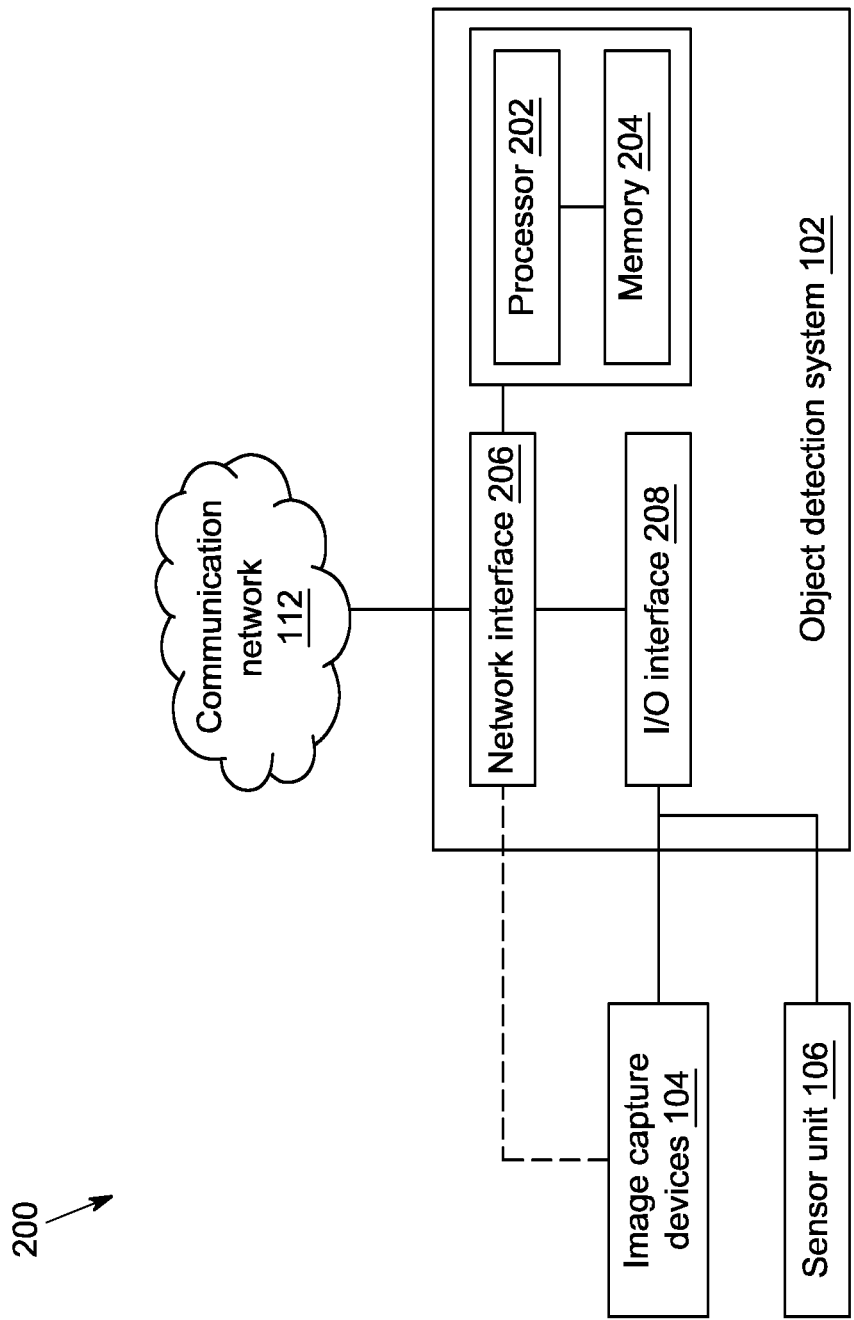
FIG. 2 is a diagram that illustrates a system for determining distance to an object on a road.

FIG. 2 is a diagram that illustrates a system for determining distance to an object on a road. FIG. 2 is explained in conjunction with elements from FIG. 1. With reference to FIG. 2, there is shown a block diagram 200 of the obstacle detection system 102. The obstacle detection system 102 may include one or more processors, such as a processor 202, a memory 204, a network interface 206 and an input/output (I/O) interface 208. The I/O interface 208 may be connected to a plurality of image capture devices 104 and the sensor unit 106.

The processor 202 may comprise suitable logic, circuitry, and interfaces that may be configured to execute instructions stored in the memory 204. The processor 202 may be further configured to control the at least one motor of each of the at least two image capture devices 104 to capture the field of view. The processor 202 may be configured for determining distance of the vehicle 108 to the object 116 on the road 116. The processor 202 may be further configured to validate the location data, the motion data, and the calculated distance of the vehicle 108 from the object 116. The processor 202 may be configured to generate output data corresponding to the object 116, based on the validated location data, the validated motion data, and the validated distance of the vehicle 108 from the object 116. Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The processor 202 may implement a number of processor technologies known in the art such as a machine learning model, a deep learning model, such as a recurrent neural network (RNN), a convolutional neural network (CNN), and a feed-forward neural network, or a Bayesian model. The processor 202 may be communicatively coupled to the network interface 206, the I/O interface 208, and the memory 204.

The memory 204 may comprise suitable logic, circuitry, and interfaces that may be configured to store a machine code and/or instructions executable by the processor 202. The memory 204 may stores information including processor instructions for determining distance to an object on a road. The memory 1104 may be used by the processor 1102 to store temporary values during execution of processor instructions. The memory 204 may store data from the sensor unit 106 and the map database of the server 110. The map database may be configured to store instructions associated with a plurality of intelligent services that operates in the obstacle detection system 102. The data from the sensor unit 106 may correspond to location data, motion data associated with the vehicle 108. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the obstacle detection system 102 and other systems and devices in the network environment 100, via the communication network 112. The network interface 206 may communicate with the one or more cloud servers, such as the server 110, via the communication network 112 under the control of the processor 202. The network interface 202 may be implemented by use of known technologies to support wired or wireless communication of the obstacle detection system 102 with the communication network 112. Components of the network interface 206 may include, but are not limited to, an antenna, a radio frequency (RF) transceiver, one or more amplifiers, a tuner, one or more oscillators, a digital signal processor, a coder-decoder (CO-DEC) chipset, a subscriber identity module (SIM) card, and/or a local buffer circuit.

The I/O interface 208 may comprise suitable logic, circuitry, and interfaces that may be configured to operate as an I/O channel/interface between a user (e.g., a driver) and different operational components of the obstacle detection system 102 or other devices (e.g., the sensor unit 106). The I/O interface 208 may facilitate an I/O device (for example, an I/O console) to receive an input (e.g., the plurality of images) and present an output based on the received input. The I/O interface 208 may include various input and output ports to connect various I/O devices that may communicate with different operational components of the obstacle detection system 102. Examples of the input devices may include, but is not limited to, a touch screen, a keyboard, a mouse, a joystick, a microphone, and an image-capture device. Examples of the output devices may include, but is not limited to, a display, a speaker, a haptic output device, or other sensory output devices.

Figure 3A:
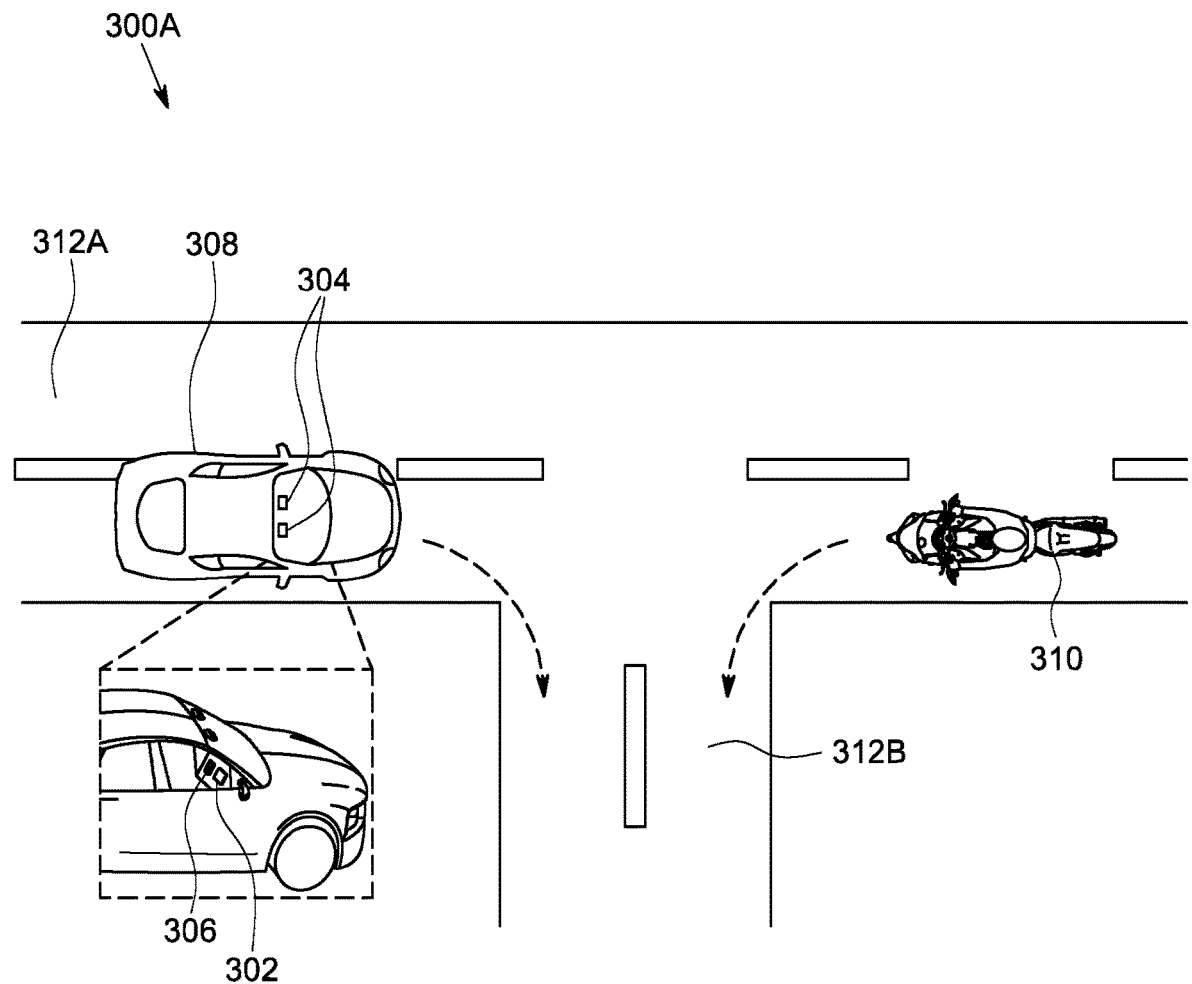
FIG. 3A illustrates an exemplary scenario for implementation of the system and method for determining distance to an object on a road, in accordance with an embodiment of the disclosure.
Figure 3B:
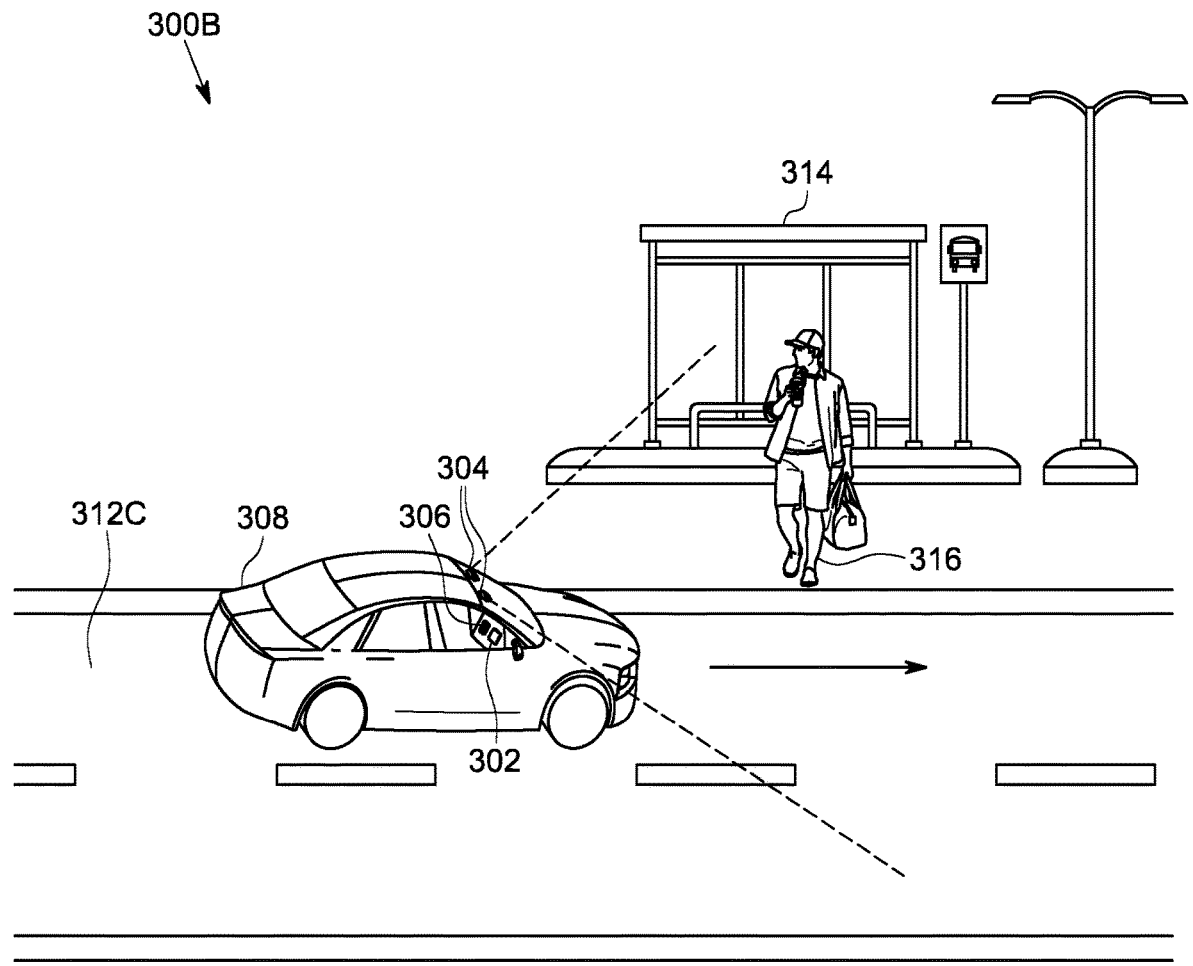
FIG. 3B illustrates an exemplary scenario for implementation of the system and method for generation of notification signals in a vehicle to assist a driver during navigation, in accordance with an embodiment of the disclosure.

The operations performed by the processor 202 have been further described in FIGS. 3A and 3B with an example. Notwithstanding, the object 116 may also be other classified object, without limiting the scope of the disclosure.

FIGS. 3A and 3B, collectively, illustrate an exemplary scenario for implementation of the system and method for determining distance to an object on a road, in accordance with an embodiment of the disclosure. FIG. 3A illustrates the system and method for determining distance to an object on a road to avoid collision of a vehicle with an obstacle, in accordance with an embodiment of the disclosure. FIG. 3A is explained in conjunction with elements from FIG. 1 and FIG. 2. With reference to FIG. 3A, there is shown an obstacle detection system 302, a plurality of image capture devices 304, a sensor unit 306, a vehicle 308, a motorcycle 310, a road segment 312A and a road segment 312B. The road 312A may support bi-directional traffic with the vehicle 308 traveling in one direction and the motorcycle 310 may be traveling in an opposite direction of the vehicle 308 on the road 312A. The motorcycle 310 may act as an obstacle for the vehicle 308.

In accordance with the exemplary scenario, the obstacle detection system 302 may be installed in the vehicle 308. The obstacle detection system 302 may be integrated with a user equipment of the vehicle 308. In accordance with an embodiment, the vehicle 308 may be a passenger vehicle. The vehicle 308 may operate in an autonomous mode or manual mode. For example, a driver of the vehicle 308 may have to attend to a customer demand on a smart phone application associated with the obstacle detection system 302 while driving the vehicle 308. As a result, the driver may lose focus on the driving while interacting with the smart phone application. The less focus of the driver may cause inaccurate determination of the distance of the motorcycle 310 from the vehicle 308 that may result in collision of the vehicle 308 with objects, such as the motorcycle 310 on the road 312A.

For accurate determination of the distance between the vehicle 308 and the motorcycle 310, the plurality of image capture devices 304 may be installed inside or outside the vehicle 308 to capture a field of view of the vehicle 308. The field of view may capture the surroundings of the vehicle 308. The surroundings of the vehicle may include a presence of a motorcycle 310 on the road segment 312A. The plurality of image capture devices 304 may be communicatively coupled to the obstacle detection system 302 via a communication network. The obstacle detection system 302 may be configured to receive visual data of plurality of images captured by the plurality of image capture devices 304.

The obstacle detection system 302 may be configured to interpolate the plurality of images to an instance of time, such as a first instance in time to compensate for timing gaps in capture of the plurality of images. Therefore, the obstacle detection system 302 may be configured to calibrate the plurality of image capture devices 304 through a processor, such as the processor 202. The processor 202 may implement a number of processor technologies known in the art such as a machine learning model, a deep learning model, such as a recurrent neural network (RNN), and a convolutional neural network (CNN). Advantageously, the obstacle detection system 302 may not require dedicated expensive hardware that requires special installation to calculate the distance of the object captured from the plurality of image capture devices 304. Further, the calibration and alignment of the plurality of image capture devices 304 may not have to be critical to work properly unlike systems that use stereo vision and LIDAR system for calculation of the distance of objects. Such systems may not be accurate because of the problems in the alignment of the equipment and movements of the installed components and there are no safety references to validate the accuracy of the calculation of the distance between the objects.

The obstacle detection system 302 may be configured to time align the plurality of images to be captured by the plurality of image capture devices 304 such that the time aligned images may be artificially produced by interpolating the plurality of images to a common time stamp. The time alignment of images may not require hardware synchronization. The obstacle detection system 302 may use different interpolation methods, such as simple pixel interpolation and convolution neural network (CNN) for time alignment or time synchronization of the images.

The obstacle detection system 302 may be configured to receive visual data of the plurality of images corresponding to the motorcycle 310 in a field-of-view of the vehicle 308 on the road 312A. The plurality of images may be time synchronized to the first instance in time. The obstacle detection system 302 may be further configured to detect the motorcycle 310 from the received visual data of the plurality of images. The obstacle detection system 302 may use various object detection algorithms, such as image recognition algorithms, object identification algorithms, and canny detectors to detect the objects in the field of view of the vehicle 308.

The obstacle detection system 302 may be configured to classify the detected object (such as the motorcycle 310) into an object type of 2 wheelers. The obstacle detection system 302 may use various object classification algorithms, such as object classification algorithms to classify the objects in the field of view of the vehicle 308.

After the detection and classification of the motorcycle on the road 312 that may be approaching towards the vehicle 308, the obstacle detection system 302 may be configured to calculate a distance of the vehicle 308 from the motorcycle 310. In accordance with an embodiment, the obstacle detection system 102 may be configured to process the visual data received from the plurality of image capture devices 304 into depth information for calculation of the distance of the vehicle 108 from the motorcycle 310. In accordance with an embodiment, the obstacle detection system 302 may calculate the distance of the vehicle 108 based on a navigation application installed in the user equipment of the vehicle 308 or a smart phone in the vehicle 308. In accordance with another embodiment, information from the navigation application may determine that how fast the vehicle 308 may approach the motorcycle 310.

The obstacle detection system 302 may be configured to obtain motion data and location data of the vehicle 308 corresponding to the first instance in time from the sensor unit 306. The vehicle 308 may be configured with the sensor unit 306 that includes a plurality of sensors. The sensor unit 306 may be configured to generate location data and motion data related to the vehicle 308 in an instance in time, such as the first instance in time. In accordance with an embodiment, the location data may represent data associated with a geographic location of the vehicle 308 in the first instance of time. The first instance of time may correspond to the time when the location data may be collected. In accordance with an embodiment, the location data may be determined by visual odometry, triangulation systems such as A-GPS, Cell of Origin, or other location extrapolation technologies. In accordance with an embodiment, the motion data may represent data associated with velocity or speed of the vehicle in the first instance of time.

The obstacle detection system 302 may be further configured to obtain map data corresponding to the location data of the vehicle 308. The map data received by the obstacle detection system 302 may include, but not limited to, a geographic location, or a route desired by a user of the vehicle 308. The obstacle detection system 302 may receive map data for a requested map data for a road segment of interest, such as the road 312A by performing a location-based query of the geographic database in the server 110 or equivalent. For example, the map data may include any attribute of the road 312A or corresponding map location stored in the geographic database of the server 108. The map data may represent the turns in the road 312A. Further, the received map data may include, but is not limited to, one or more of a functional class of the road, a speed limit of the road, a presence of a road sign on the road, directionality of the road, a number of lanes in the road, a speed category, and a distance to a point of interest, such as the object 116. Therefore, the obstacle detection system 302 may obtain the information regarding the road 312B for which the vehicle 308 on road 312A may turn on right to follow the desired route that may be selected by the user of the vehicle 302.

The map data may include a speed limit associated with the road 312A. The obstacle detection system 302 may be further configured to determine a speed of the vehicle 308 corresponding to the first instance in time. The speed of the vehicle 308 may be determined based on the motion data received by the obstacle detection system 302 from the sensor unit 306. The obstacle detection system 302 may be further configured to correlate the determined speed of the vehicle 308 to the speed limit associated with the road 312A to validate the motion data. The validation of the motion data to speed limit of the road may increase the accuracy of the obstacle detection system 302 to avoid hazards on the road.

The map data may include a path with a number of lanes of the road 312A. The obstacle detection system 302 may be further configured to determine a location of the vehicle 308 corresponding to the first instance in time. The location of the vehicle 308 may be determined based on the location data received by the obstacle detection system 302 from the sensor unit 306. The obstacle detection system 302 may be further configured to correlate the calculated distance of the vehicle 308 from the motorcycle 310 to the path of the road 312A and 312B to validate the calculated distance of the vehicle 308 from the motorcycle 310 on the road 312A.

The obstacle detection system 302 may be further configured to validate the location data, the motion data, and the calculated distance of the vehicle 308 from the motorcycle 310. The validation of the location data, the motion data, and the calculated distance may be based on the map data. The validation of the location data, the motion data, and the calculated distance of the vehicle 108 from the motorcycle 310, based on the map data may improve the accuracy of how far the object 116 may be from the vehicle 108 to avoid collision with the motorcycle or any hazard on the road.

The obstacle detection system 102 may be further configured to generate output data corresponding to the object 116, based on the validated location data, the validated motion data, and the validated distance of the vehicle 108 from the object 116. The generated output data may correspond to a notification message based on the calculated distance of the vehicle 108 from the object 116 being less than a threshold distance. The threshold distance may be preset in the obstacle detection system 102. The notification message may be generated when the threshold distance is exceeded. The notification message may be an audio signal, a video signal, a text or a graphical message on a display screen of the user equipment associated with the obstacle detection system 302.

FIG. 3B illustrates the system and method for determining a distance to an object on a road to avoid collision of a vehicle with an obstacle, in accordance with an embodiment of the disclosure. FIG. 3B is explained in conjunction with elements from FIG. 1, FIG. 2 and FIG. 3A. With reference to FIG. 3B, there is shown the obstacle detection system 302, the plurality of image capture devices 304, the sensor unit 306, the vehicle 308, a road segment 312C, a public vehicle halt 314. There is further shown a commuter 316 standing on a side of the road 312C. The road 312C may support bi-directional traffic.

In accordance with an embodiment, the vehicle 308 may be in an autonomous mode or manual mode with a driver driving the vehicle 308. While using the roads, the mind of the driver may wander to things other than driving. For example, the driver may be interacting with a smartphone application or user equipment of the vehicle 308 all the while he is driving. The driver may completely miss a passenger or commuter standing on the public vehicle halt 314 who may be a potential customer for the driver of the vehicle 308. In accordance with an embodiment, when the vehicle 308 may be in the autonomous mode, the vehicle may miss the passenger or commuter 316 standing on the public vehicle halt 314 without imaging sensors equipped on the vehicle.

In accordance with an embodiment, the obstacle detection system 302 may include a plurality of image capture devices 304 to capture a field of view from the vehicle 308. In some embodiments, the plurality of image capture devices 304 may be communicatively coupled with the obstacle detection system 302 via a communication network. The plurality of image capture devices 304 may be configured to capture plurality of images of a view of the public vehicle halts, such as the public vehicle halt 314 to detect the potential customers for the vehicles, such as the vehicle 308.

The obstacle detection system 302 may be configured to receive visual data related to the captured plurality of images. The detection of objects, classification of objects and calculation of the distance of the vehicle from the objects have been explained in FIG. 3A. The obstacle detection system 302 may be configured to generate notification data on detection of the potential customers on public vehicle halts. In accordance with an embodiment, the obstacle detection system 302 may be configured to generate notification data when the commuter 316 is standing on the road 312C.

Figure 4:
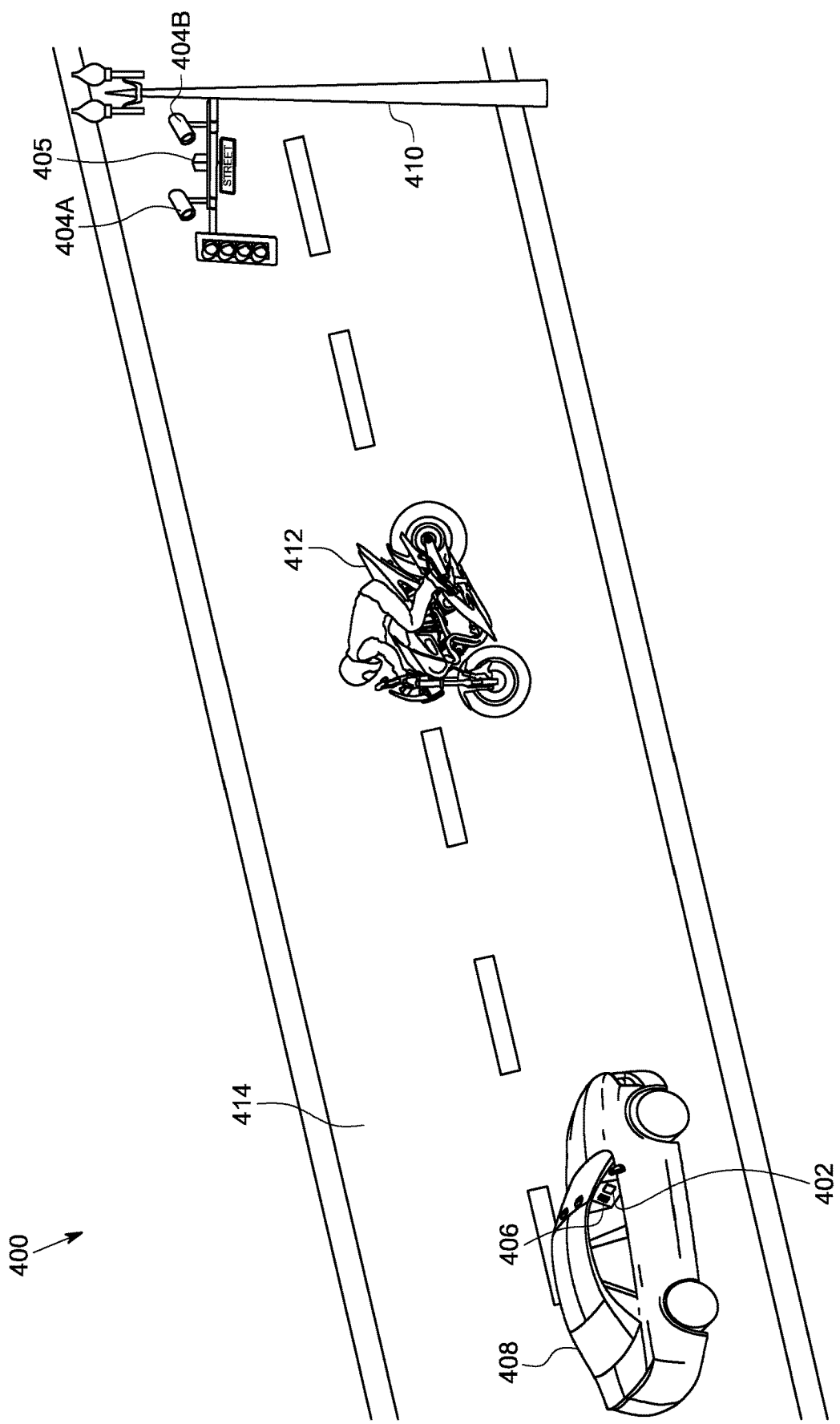
FIG. 4 illustrates an exemplary scenario for implementation of the system and method for determining distance to an object on a road when image capture devices are mounted away from the system, in accordance with another embodiment of the disclosure.

FIG. 4 illustrates an exemplary scenario for implementation of the system and method for determining distance to an object on a road when image capture devices are mounted away from the system, in accordance with another embodiment of the disclosure. FIG. 4 is explained in conjunction with elements from FIG. 1, FIG. 2, FIG. 3A and FIG. 3B. With reference to FIG. 4, there is shown the obstacle detection system 402, the plurality of image capture devices 404, such as a first image capture device 404a and a second image capture device 404b, the sensor unit 406, the vehicle 408, a traffic pole 410, a motorcycle 412, a road segment 414 and a motor 416. The road 414 may support bi-directional traffic.

The obstacle detection system 402 may be installed in the vehicle 408. The vehicle 408 may operate in an autonomous mode or a manual mode with a driver (not shown in the FIG. 4). The sensor unit 406 may be communicatively coupled with the obstacle detection system 402 or directly integrated with the obstacle detection system 402. With reference to FIG. 4, the plurality of image capture devices 404, namely, the first image capture device 404a and the second image capture device 404b may be mounted on the traffic pole 410 to capture images or videos of traffic view. In accordance with an embodiment, the plurality of image capture devices 404 may be installed anywhere, such as a building, a tree, or under the bridge. The obstacle detection system 402 may be communicatively coupled to the image capture device 404 via a communication network. The vehicle 408 may be moving in one direction on the road 414 and the motorcycle 412 may have entered a wrong lane which may prove hazardous for users in the vehicle 408 and a rider of the motorcycle 412.

The plurality of image capture devices 304 that may be installed on the traffic pole may capture the images of the traffic view. The obstacle detection system 402 may be configured to receive the receive visual data of the plurality of images corresponding to the motorcycle 412 in the traffic view which may be a field of view for the vehicle 402 on the road 414. The motor 416 may be configured to control movement of the second image capture device 404b. The motor 416 may be configured to provide accurate positioning to the second image capture devices 404b to capture the plurality of images of a field of view from the vehicle 408. In accordance with an embodiment, the second image capture device 404b may include one motor 416 of a motor unit. The obstacle detection system 402 may be further configured to control the at least one motor of each of the at least two image capture devices 104 to capture the field of view. The motor 416 in may be configured to control movement of the second image capture device 404b to capture one or more of the plurality of images. In accordance with an exemplary embodiment, the motor 416 may be configured to control a second image capture device 404b. In accordance with an embodiment, the first image capture device 404a may capture the plurality of images of the field of view at first instance of time. The second capture device 404b that may be controlled by the motor 416 may capture the plurality of images of the same field of view as captured by the first image capture device 404a at a second instance of time. In accordance with an embodiment, the motor 416 may be communicatively coupled to the second image capture device 404b. In accordance with an embodiment, the motor 416 may be integrated into the second image capture device 404b as a single entity. The obstacle detection system may be configured to control the motor 416 for synchronization of the first image capture device 404a and the second image capture device 404b. However, in accordance with an embodiment, the obstacle detection system 102 may avoid synchronization of the first image capture device 404a and the second image capture device 404b through software and image processing.

The obstacle detection system 102 may be configured to interpolate the plurality of images to the first instance in time to compensate for timing gaps in capture of the plurality of images for time alignment of the first image capture device 404a and the second image capture device 404b. The type aligned or time synced images may be generated for a common time stamp. The interpolation of the images may be performed by interpolation methods, such as simple pixel interpolation and convolutional neural network (CNN). Interpolation of images may help in easy installation and fault tolerance of the first image capture device 404a and the second image capture device 404b as hardware synchronization of the image capture devices 104 may not be required.

The obstacle detection system 402 may be configured to generate output message to alert the vehicle 408 for potential hazard on the road 414. The operation of the obstacle detection system 402 has been explained in FIG. 1 to FIG. 3B.

Figure 5:
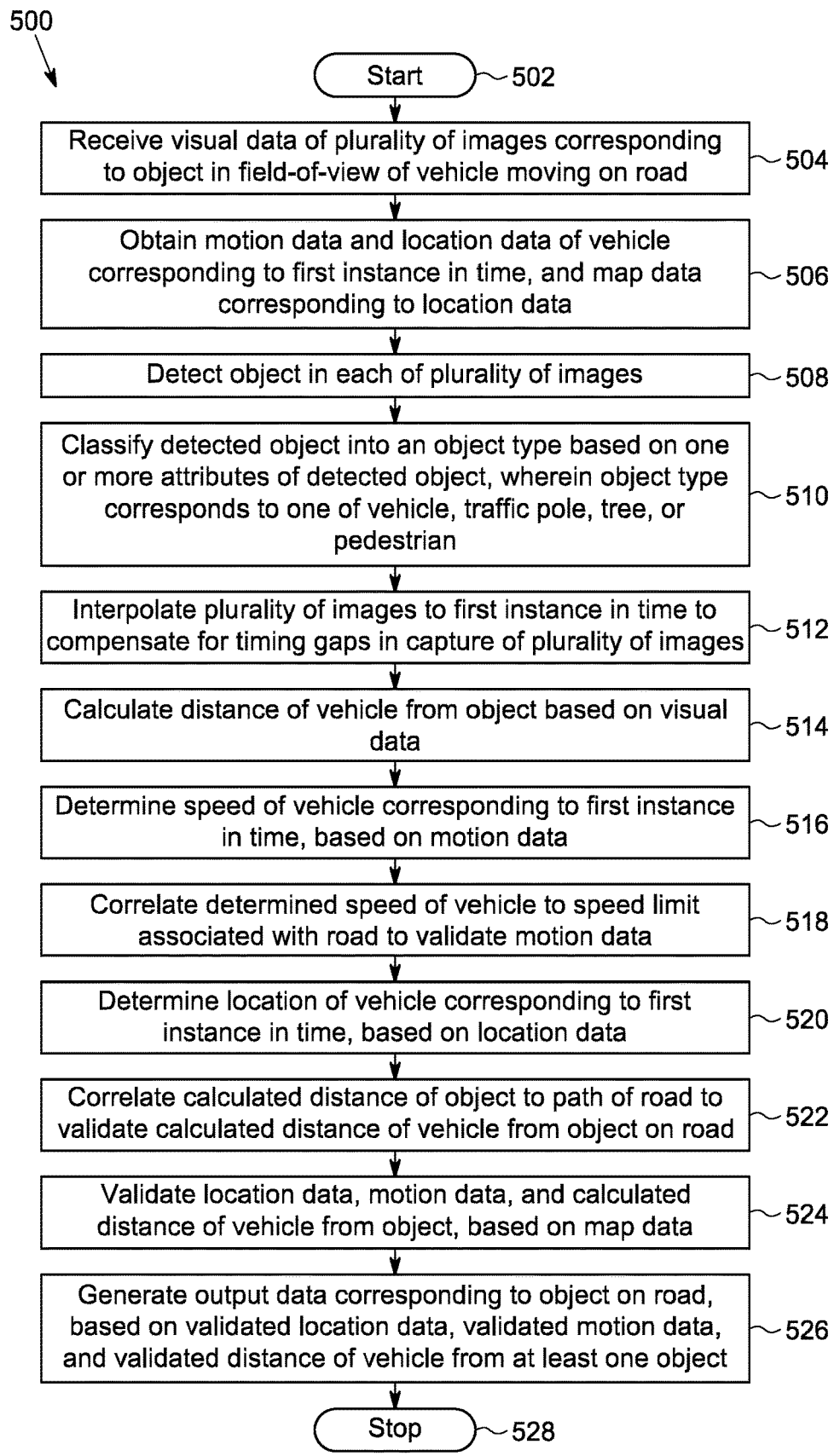
FIG. 5 is a flow chart that shows a processing pipeline for implementation of an exemplary method for determining distance to an object on a road, in accordance with an embodiment of the disclosure.

FIG. 5 illustrates a flowchart for implementation of an exemplary method for determining a distance to the object on a road to avoid collision with the object, in accordance with an embodiment of the disclosure. With reference to FIG. 5, there is shown a flowchart 500. The flowchart 500 is described in conjunction with elements from FIGS. 1, 2, 3A, 3B and 4. The method, in accordance with the flowchart 500, may be implemented in the obstacle detection system 102. The method starts at 502 and proceeds to 504.

At 504, visual data of a plurality of images corresponding to the object in a field-of-view of a vehicle moving on a road may be received from the plurality of image capture devices 104. The obstacle detection system 102 may be configured to receive the visual data of a plurality of images corresponding to the object in a field-of-view of a vehicle moving on a road. The plurality of images may be time synchronized to a first instance in time At 506, motion data and location data of the vehicle corresponding to the first instance in time, and map data corresponding to the location data may be obtained. The obstacle detection system 302 may be configured to obtain motion data and location data of the vehicle corresponding to the first instance in time, and map data corresponding to the location data.

At 508, the object 310 may be detected in each of the plurality of images. The obstacle detection system 302 may be configured to detect the object 310 in each of the plurality of images. The obstacle detection system 302 may use various object detection algorithms, such as image recognition algorithms, object identification algorithms, and canny detectors to detect the objects in the field of view of the vehicle 308.

At 510, the detected object may be classified into an object type based on one or more attributes of the detected object. The object type corresponds to one of a vehicle, a traffic pole, a tree, or a pedestrian. The obstacle detection system 302 may be configured to classify the detected object into an object type based on one or more attributes of the detected object. The obstacle detection system 302 may use various object classification algorithms, such as object classification algorithms to classify the objects in the field of view of the vehicle 308.

At 506, the plurality of images may be interpolated to the first instance in time to compensate for timing gaps in capture of the plurality of images. The obstacle detection system 302 may be configured to interpolate the plurality of images to the first instance in time to compensate for timing gaps in capture of the plurality of images.

At 508, a distance of the vehicle may be calculated from the object based on the visual data. The obstacle detection system 302 may be configured to calculate a distance of the vehicle from the object based on the visual data.

At 510, a speed of the vehicle may be determined corresponding to the first instance in time, based on the motion data. The obstacle detection system 302 may be configured to determine a speed of the vehicle corresponding to the first instance in time, based on the motion data.

At 512, the determined speed of the vehicle may be correlated to the speed limit associated with the road to validate the motion data. The obstacle detection system 302 may be configured to correlate the determined speed of the vehicle to the speed limit associated with the road to validate the motion data.

At 514, a location of the vehicle may be determined corresponding to the first instance in time, based on the location data. The obstacle detection system 302 may be configured to determine a location of the vehicle corresponding to the first instance in time, based on the location data At 516, the calculated distance of the object may be correlated to the path of the road to validate the calculated distance of the vehicle from the object on the road. The obstacle detection system 302 may be configured to correlate the calculated distance of the object to the path of the road to validate the calculated distance of the vehicle from the object on the road At 518, the location data, the motion data, and the calculated distance of the vehicle may be validated from the object, based on the map data. The obstacle detection system 302 may be configured to validate the location data, the motion data, and the calculated distance of the vehicle from the object, based on the map data.

At 520, output data may be generated corresponding to the object on the road, based on the validated location data, the validated motion data, and the validated distance of the vehicle from the at least one object. The obstacle detection system 302 may be configured to generate output data corresponding to the object on the road, based on the validated location data, the validated motion data, and the validated distance of the vehicle from the at least one object. The method in the flowchart 500 ends at 522.

Various embodiments of the disclosure may provide a non-transitory computer readable medium and/or storage medium, and/or a non-transitory machine readable medium and/or storage medium with a machine code and/or a set of instructions stored thereon and executable by a machine and/or a computer for determining a distance to the object on a road. The set of instructions in the obstacle detection system 102 may cause the machine and/or computer to perform the steps that comprise reception of visual data of a plurality of images corresponding to the object in a field-of-view of a vehicle on the road, where the plurality of images are time synchronized to a first instance in time (FIG. 1). Motion data and location data of the vehicle 108 may be obtained corresponding to the first instance in time, and map data corresponding to the location data. A distance of the vehicle 104 may be calculated from the object based on the visual data. The location data, the motion data, and the calculated distance of the vehicle 108 may be validated from the object 116, based on the map data. Output data corresponding to the object may be generated based on the validated location data, the validated motion data, and the validated distance of the vehicle 108 from the object 116.

The map data may include one or more of a functional class of the road, a speed limit of the road, a presence of a road signs on the road, directionality of the road, a number of lanes in the road, a speed category, and a distance to a point of interest. The map data may include a speed limit associated with the road. The obstacle detection system 102 may be configured to determine a speed of the vehicle corresponding to the first instance in time, based on the motion data. The obstacle detection system 102 may be configured to correlate the determined speed of the vehicle to the speed limit associated with the road to validate the motion data.

The map data may include a path with a number of lanes of the road. The obstacle detection system 102 may be configured to determine a location of the vehicle corresponding to the first instance in time, based on the location data. The obstacle detection system 102 may be configured to correlate the calculated distance of the object to the path of the road to validate the calculated distance of the vehicle from the object on the road. The obstacle detection system 102 may further comprise a plurality of image capture devices configured to capture the plurality of images. The obstacle detection system 102 may be configured to detect the object in each of the plurality of images. The obstacle detection system 102 may be configured to interpolate the plurality of images to the first instance in time to compensate for timing gaps in capture of the plurality of images.

The obstacle detection system 102 may be configured to generate a notification message based on the calculated distance of the vehicle from the object being less than a threshold distance. The obstacle detection system 102 may be configured to classify the detected object into an object type based on one or more attributes of the detected object, wherein the object type corresponds to one of a vehicle, a traffic pole, a tree, or a pedestrian.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

We claim:

1. A system for determining distance to an object on a road, comprising:
at least one memory configured to store instructions; and
at least one processor configured to execute the instructions to:
receive visual data of a plurality of images corresponding to the object in a field-of-view of a vehicle on the road, wherein the plurality of images are time synchronized to a first instance in time;
obtain motion data and location data of the vehicle corresponding to the first instance in time, and map data corresponding to the location data;
calculate a distance of the vehicle from the object based on the visual data;
validate the location data, the motion data, and the calculated distance of the vehicle from the object, based on the map data; and
generate output data corresponding to the object, based on the validated location data, the validated motion data, and the validated distance of the vehicle from the object.

2. The system of claim 1, wherein the map data includes one or more of a functional class of the road, a speed limit of the road, a presence of a road sign on the road, directionality of the road, a number of lanes in the road, a speed category, and a distance to a point of interest.

3. The system of claim 1,
wherein the map data comprises a speed limit associated with the road, and
wherein the at least one processor is further configured to:
determine a speed of the vehicle corresponding to the first instance in time, based on the motion data; and
correlate the determined speed of the vehicle to the speed limit associated with the road to validate the motion data.

4. The system of claim 1,
wherein the map data comprises a path with a number of lanes of the road, and
wherein the at least one processor is further configured to:
determine a location of the vehicle corresponding to the first instance in time, based on the location data; and
correlate the calculated distance of the object to the path of the road to validate the calculated distance of the vehicle from the object on the road.

5. The system of claim 1, further comprising a plurality of image capture devices configured to capture the plurality of images.

6. The system of claim 5,
wherein each of at least two image capture devices of the plurality of image capture devices comprises at least one motor configured to provide accurate positioning to a respective one of the at least two image capture devices to capture at least one of the plurality of images, and
wherein the at least one processor is further configured to control the at least one motor of each of the at least two image capture devices to capture the field of view.

7. The system of claim 6, wherein the at least one processor is further configured to detect the object in each of the plurality of images.

8. The system of claim 7, wherein the at least one processor is further configured to interpolate the plurality of images to the first instance in time to compensate for timing gaps in capture of the plurality of images.

9. The system of claim 7, wherein the at least one processor is further configured to classify the detected object into an object type based on one or more attributes of the detected object, wherein the object type corresponds to one of a vehicle, a traffic pole, a tree, or a pedestrian.

10. The system of claim 1, wherein the at least one processor is further configured to generate a notification message based on the calculated distance of the vehicle from the object being less than a threshold distance.

11. A method for determining distance to an object on a road, comprising:
receiving visual data of a plurality of images corresponding to the object in a field-of-view of a vehicle on the road, wherein the plurality of images are time synchronized to a first instance in time;
obtaining motion data and location data of the vehicle corresponding to the first instance in time, and map data corresponding to the location data;
calculating by a processor, a distance of the vehicle from the object based on the visual data;
validating by the processor, the location data, the motion data, and the calculated distance of the vehicle from the object, based on the map data; and
generating output data corresponding to the object, based on the validated location data, the validated motion data, and the validated distance of the vehicle from the object.

12. The method of claim 11, wherein the map data includes one or more of a functional class of the road, a speed limit of the road, a presence of a road sign on the road, directionality of the road, a number of lanes in the road, a speed category, and a distance to a point of interest.

13. The method of claim 11,
wherein the map data comprises a speed limit associated with the road, and wherein the method further comprises:
  determining a speed of the vehicle corresponding to the first instance in time, based on the motion data; and
  correlating the determined speed of the vehicle to the speed limit associated with the road to validate the motion data.

14. The method of claim 11,
wherein the map data comprises a path with a number of lanes of the road, and
wherein the method further comprises:
  determining a location of the vehicle corresponding to the first instance in time, based on the location data; and
  correlating the calculated distance of the object to the path of the road to validate the calculated distance of the vehicle from the object on the road.

15. The method of claim 11, further comprising capturing by a plurality of image capture devices, the plurality of images.

16. The method of claim 15, further comprising detecting the object in each of the plurality of images.

17. The method of claim 16, further comprising interpolating the plurality of images to the first instance in time to compensate for timing gaps in capture of the plurality of images.

18. The method of claim 16, further comprising classifying the detected object into an object type based on one or more attributes of the detected object, wherein the object type corresponds to one of a vehicle, a traffic pole, a tree, or a pedestrian.

19. The method of claim 11, further comprising generating a notification message based on the calculated distance of the vehicle from the object being less than a threshold distance.

20. A computer program product comprising at least one non-transitory computer-readable storage medium having stored thereon computer-executable program code instructions which when executed by a computer, cause the computer to carry out operations for determining distance to an object on a road, the operations comprising:
  receiving visual data of a plurality of images corresponding to the object in a field-of-view of a vehicle on the road, wherein the plurality of images are time synchronized to a first instance in time;
  obtaining motion data and location data of the vehicle corresponding to the first instance in time, and map data corresponding to the location data;
  calculating a distance of the vehicle from the object based on the visual data;
  validating the location data, the motion data, and the calculated distance of the vehicle from the object, based on the map data; and
  generating output data corresponding to the object, based on the validated location data, the validated motion data, and the validated distance of the vehicle from the object.

* * * * *